Nov. 5, 1957  G. ERICSSON  2,811,771
WORKPIECE HOLDER
Filed April 4, 1955  2 Sheets-Sheet 1
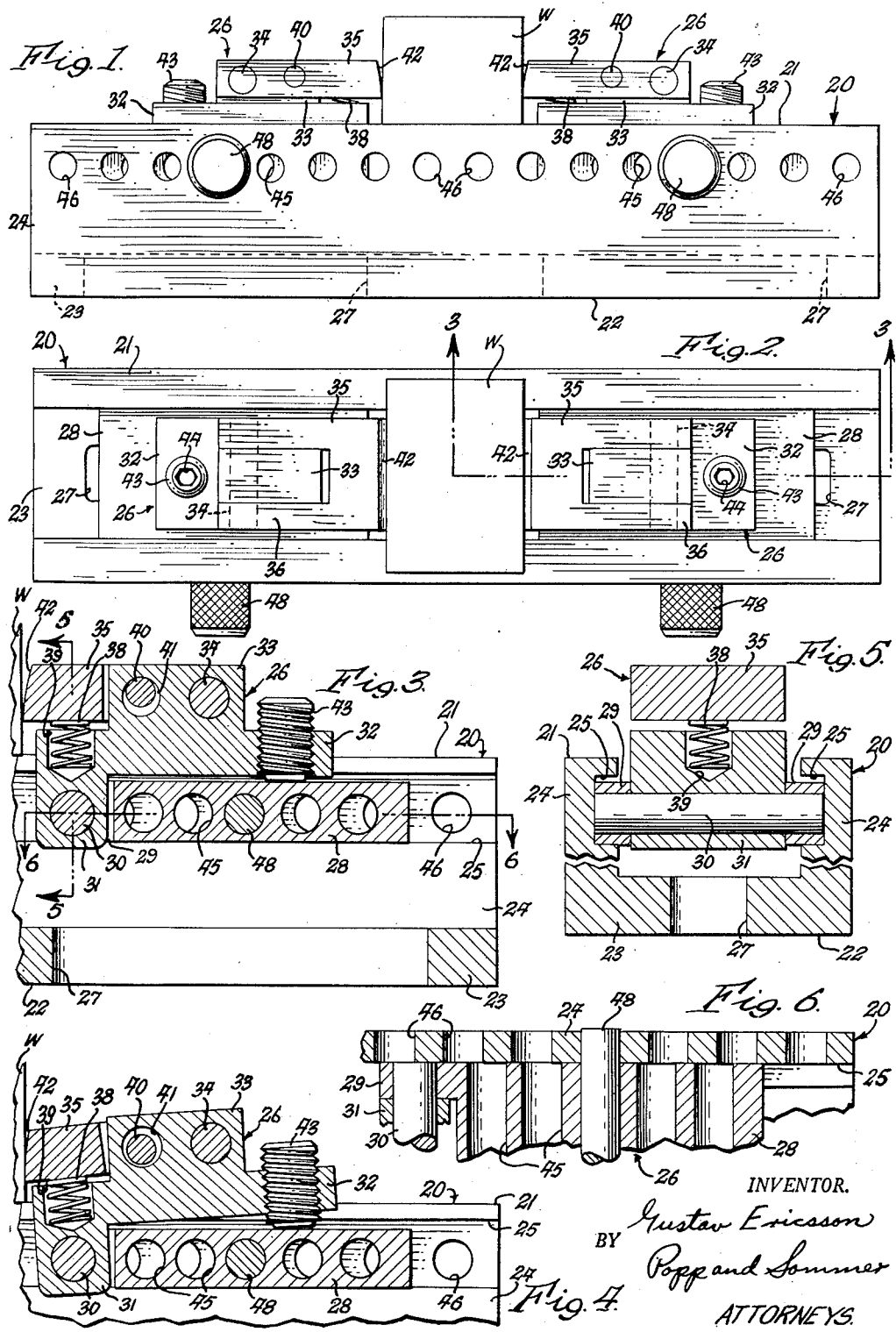
INVENTOR.
Gustav Ericsson
BY Popp and Sommer
ATTORNEYS.

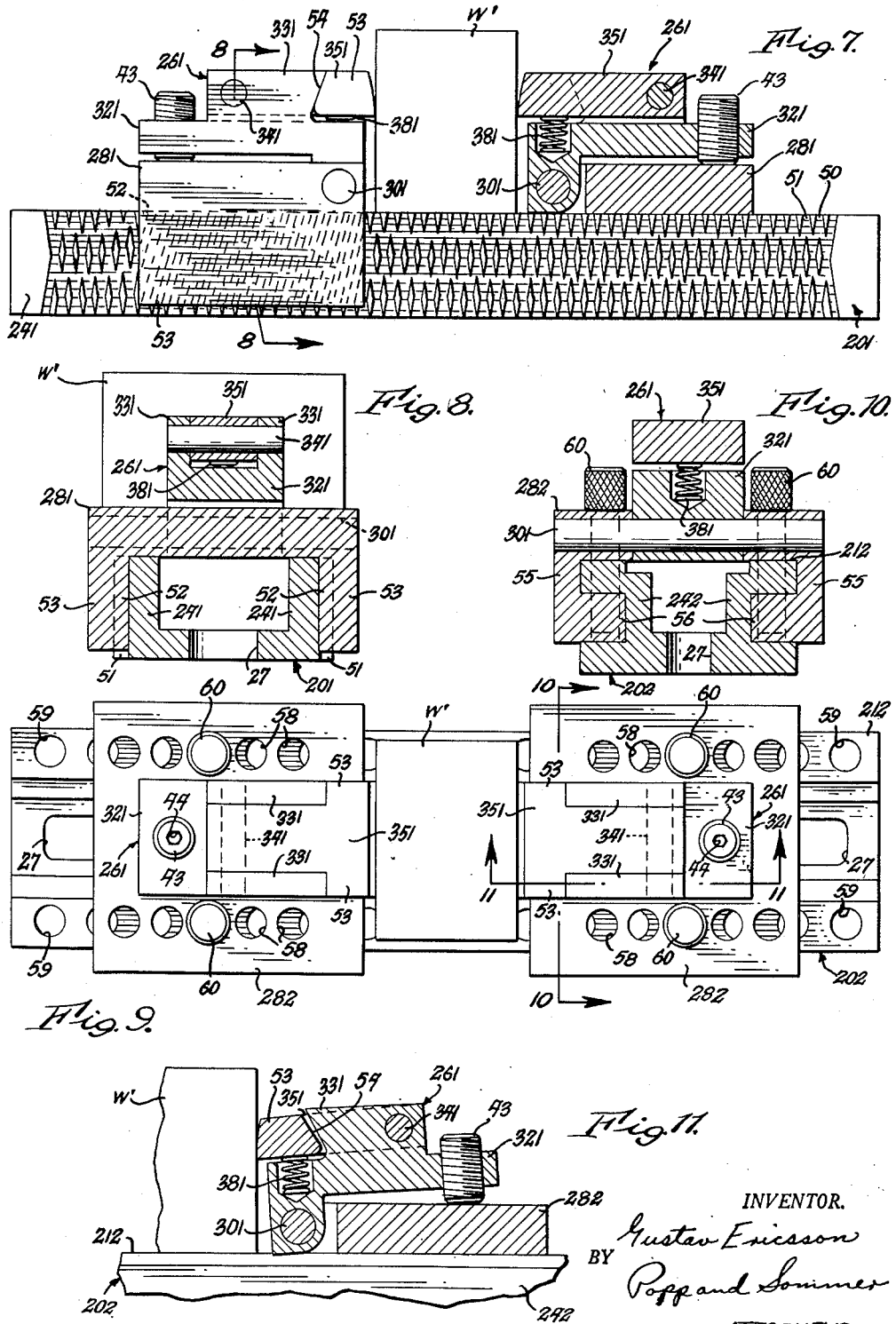

United States Patent Office 2,811,771
Patented Nov. 5, 1957

2,811,771
WORKPIECE HOLDER
Gustav Ericsson, Kenmore, N. Y.
Application April 4, 1955, Serial No. 498,832
10 Claims. (Cl. 90—59)

This invention relates to a device for holding a workpiece for operations to be performed thereon by a machine tool.

The primary object of the present invention is to provide a workpiece holder which not only clamps the workpiece in the manner of a vice but in addition, the holder acts as a parallel so that a flat surface on the workpiece is assured of parallelism with a surface on the holder.

Another object is to provide such a combination clamp and parallel workpiece holder which can be quickly adjusted to permit the workpiece to be removed and another workpiece readily substituted without throwing the setup out of square.

Another object is to provide such a holder which is relatively simple in construction, inexpensive to manufacture, easy to operate and adaptable for holding a wide variety of sizes of workpieces.

Other objects and advantages of the present invention will be apparent from the description and accompanying drawings in which:

Fig. 1 is a side elevational view of a holder embodying one form of the present invention and showing a workpiece arranged thereon but with clamping devices not adjusted so as to firmly clamp such workpiece.

Fig. 2 is a top elevational view of the holder and workpiece shown in Fig. 1.

Fig. 3 is an enlarged fragmentary vertical sectional view of the right hand portion of the holder shown in Figs. 1 and 2, this view being taken on line 3—3, Fig. 2.

Fig. 4 is a view similar to Fig. 3 but of a still more fragmentary nature and showing one of the clamping devices arranged in an operative or clamped position.

Fig. 5 is a vertical transverse sectional view thereof taken on line 5—5, Fig. 3.

Fig. 6 is a fragmentary horizontal sectional view thereof taken on line 6—6, Fig. 3.

Fig. 7 is a side elevational view embodying another form of the present invention and showing the clamping devices in an inoperative condition with respect to the workpiece.

Fig. 8 is a vertical transverse sectional view thereof taken on line 8—8, Fig. 7.

Fig. 9 is a top elevational view of still a further embodiment of the present invention.

Fig. 10 is a vertical transverse sectional view thereof taken on line 10—10, Fig. 9.

Fig. 11 is a fragmentary vertical longitudinal section through the right hand clamping device shown in Fig. 9, this view being taken on line 11—11 thereof and showing the clamping device in operative condition whereas the same device is illustrated in an inoperative condition in Fig. 7.

Referring to Figs. 1–6 embodying one form of the present invention, the numeral 20 represents generally an elongated base having parallel upper and lower horizontal flat surfaces 21 and 22 respectively. As best shown in Fig. 5, the base 20 is generally channel shaped in cross-section, opening to its upper surface 21 and having a bottom wall 23 and transversely spaced upstanding side walls 24, 24. The inner surface of each of the side walls 24 is shown as provided with a longitudinally extending horizontal groove 25. The bottom wall 23 is shown as having a pair of longitudinally alined elongated slots 27, through which suitable fasteners (not shown) may extend for holding the base to the machine tool.

Adapted to be placed on the flat upper surface 21 of the base 20 is a workpiece represented by the letter W. Such workpiece is shown as a block having a flat bottom surface engaging the upper flat surface 21 and parallel vertical side walls. It is the purpose of the present invention to clamp such workpiece W to such surface 21 in such manner that these engaging surfaces are in full contact and are not cocked relative to each other. Such cocking is common with holders as presently constructed and occurs when clamping on opposite sides of the workpiece are forced toward each other.

In accordance with the present invention, a clamping device indicated generally at 26 is arranged on the base 20 on each of the opposite sides of the workpiece W. These clamping devices 26 are shown as being identical in construction except that one is reversely arranged with respect to the other and hence a detailed description of one such clamping device will suffice for both.

Referring to Fig. 3 in which the right hand clamping device 26 is illustrated in section, such device is shown as including a support 28. Such support is in the form of a rectangular flat block or plate adapted to be moved longitudinally of the opposing grooves 25 arranged in the side walls 24 of the base 20. The inner end of the support or slide 28 is shown as being cut out so as to leave a pair of transversely spaced ears 29 which project forwardly and horizontally. Each of these ears 29 is provided with a central hole and these holes are aligned with each other so that a pivot pin 30 can be arranged therein as shown in Fig. 5. The intermediate portion of this pivot pin 30 extends through a hole provided in the depending portion 31 of a body member 32 arranged above the slide 28. This body member 32 is shown as having an integral upstanding part 33 which in plan view is of rectangular shape with its side walls spaced inwardly of the corresponding sides of the body member 32. The upstanding part 33 has a transverse hole adjacent its outer or rear end which receives a pivot pin 34. The outer ends of the horizontal transverse pivot pin 34 extend outwardly beyond the corresponding side of the upstanding part 33 and on such extremities are arranged the free ends of a U-shaped jaw member 35 having a pair of outwardly extending horizontal arms 36 which are transversely spaced from each other and embrace the sides of the upstanding part 33. The cross part of the U-shaped jaw member is arranged on the inner side of the upstanding part 33 and this cross part is sufficiently spaced from the inner end of the upstanding part 33 so as to permit some relative movement therebetween about the axis of the pivot pin 34.

The U-shaped jaw member 35 is urged upwardly relative to the upstanding part 33 by a helical compression spring 38 arranged with its axis vertical and having its lower portion arranged in a recess 39 provided in the body member 32 at its inner end and immediately above the depending part 31. The upper end of the spring 38 bears against the bottom of the cross part of the U-shaped jaw member 35. In order to limit the upward movement of the jaw member 35 relative to the body member 32, the jaw member is shown as carrying a transverse, cylindrical, horizontal rod 40 which is anchored at its ends in any suitable manner on the arms 36. This transverse rod 40 extends through an enlarged transverse hole 41 in the upstanding part 33. Some relative movement between the rod 40 and hole 41 is permitted as can be seen by comparing Figs. 3 and 4.

The forward or exposed end face 42 of the jaw member 35 is arcuately cylindrically curved, being generated about a horizontal transverse axis located below the axis of the transverse pivot pin 34 and preferably slightly to the rear thereof. In the drawings, the center of curvature for the jaw face 42 is at about the corner between the top of the tail of the body member 32 and the vertical rear face of the upstanding part 33.

Referring to Fig. 3, pressure of the jaw face 42 against the vertical end face of the workpiece W engaged thereby will produce a line of force extending below the pivotal axis of the jaw member 35. This produces a torque on the jaw member tending to rotate it in a counterclockwise direction relative to the body member 32 as reviewed in Fig. 3. Since the work face of the jaw member tends to move downwardly a downward thrust is imparted to the workpiece.

In order to move the jaw member 35 inwardly toward the workpiece W, means are provided for pivoting the body member 32 about the axis of the pivot pin 30 relative to this body member in a counterclockwise direction as viewed in Figs. 3 and 4. Such means are shown as comprising a vertical jack screw 43 which works in a threaded hole provided in the tail part of the body member 32. The lower end of this screw 43 bears against the upper surface of the slide 28. The screw may be turned in any suitable manner and for this purpose, its upper end is shown as provided with a central out-of-round recess 44 adapted to receive an Allen wrench (not shown).

Means are provided for locking the slide 28 of each clamping device in any desired position longitudinally along the base 20. As shown in Figs. 1-4, such means include providing a series of longitudinally spaced horizontal holes 45 extending transversely through the slide 28, a series of longitudinally spaced, transversely extending horizontal holes 46 arranged in each side wall 24 of the base 20 opposite the groove 25 therein, and a locking pin 48 shown as having an enlarged externally knurled head at one end to facilitate grasping the same. The series of holes 45 in the slide 28 are spaced slightly closer together than the series of holes 46 in the base 20. In this manner, a wide range of adjustment is permitted between the slide 28 and the base 20 and when a pair of holes 46 on opposite sides of the base align with one of the holes 45 in the slide 28, the locking pin 48 can be inserted therethrough so as to secure the slide against longitudinal movement relative to the base.

Assuming the locking pin 48 for each clamping device 16 to be removed, the workpiece W is placed with its flat bottom against the top surface 21 of the base 20 and longitudinally of this base so that sufficient room will remain on either side of the workpiece to accommodate a clamping device 26. The clamping devices are then slid inwardly along the guideways 25 until they contact the workpiece W. The locking pins 48 are then inserted into the proper set of registered holes 45 and 46. This may actually occur where there is a slight spacing between the work faces 42 of the jaw members 35 and the workpiece. The parts will then be in the positions shown in Fig. 1. Thereafter, each jack screw 43 is turned so as to raise the tail part of the body member 32. This operates to swing the body member 32 about its pivot pin 30 toward the workpiece W. During such movement, the jaw member 35 of each clamping device will engage the side face of the workpiece and continued turning of the jack screw 43 will result in relative movement between the jaw member 35 and the body member 32 about the axis of the pivot pin 34. The jaw member will then take the operative position shown in Fig. 4 in which the jaw member has been moved downwardly with respect to the body member against the urging of the spring 38 therebetween. It will be understood that the work face 42 of each jaw member will have a rolling movement on the side face of the workpiece W coupled with horizontal and vertical force compartments which result in a combined force which will urge the remote lower corner of the workpiece, or that corner adjacent the other clamping device 26, downwardly against the upper part 21 of the base 20. When this operation is performed on both clamping devices 26 successively or simultaneously, it will be seen that the workpiece W is firmly held or clamped to the base 20 in such manner that a full surface to surface contact is assured between the flat bottom of the workpiece and the flat upper surface 21 of the base.

The modified form of the invention shown in Figs. 7 and 8 has only two essential differences from the form shown in Figs. 1-6. One such difference is in the manner of limiting the upward movement of the jaw member. The other difference is in the mounting of the clamping device on the base.

As shown in Figs. 7 and 8, the base 201 is channel shaped in cross section and the outer vertical surfaces of its side walls 241 are provided with a series of crossed slots 50 and 51. These slots 50 and 51 incline at a slight angle with respect to the vertical on opposite sides thereof. Adapted to be received in such slots are a series of similarly inclined ribs 52 which are provided on the support 281. This support 281 is generally of inverted channel shape in cross section having depending side walls 53 which embrace the side walls 241 of the base 201. The ribs 52 stand out from the inner surfaces of these side walls 53 and are preferably formed integrally therewith. It will therefore be seen that one series of slots 50 is used when one of the clamping devices 261 is arranged on one side of the workpiece W' and the other series of slots 51 used when a similar clamping device 261 is arranged on the opposite side of the workpiece W'. The setting of the support 261 for each clamping device with respect to the base 201 is determined by the engagement of the ribs 52 with given slots of the series 50 or 51. It will be noted that the ribs 52 incline upwardly and inwardly with respect to the workpiece W'. In mounting a clamping device 261 on the base 201, the support 281 is held above the base and then lowered causing a cam sliding action between the slots and the ribs which moves the clamping device downwardly and outwardly away from the workpiece W'.

Each clamping device 261 is shown as having a body member 321 hinged at its inner end by the pin 301 to the respective support 281. The body member 321 is shown as having a pair of transversely spaced, upstanding integral extensions 331 between which the jaw member 351 is arranged and pivoted at its outer end on the pivot pin 341. The free end of the jaw member 351 has lateral horizontal extensions 53 to provide an enlarged head which extends past the inner ends of the upstanding extensions 331 on the body member 321. The opposing faces of the lateral jaw extensions 53 and the upstanding extensions 331 are inclined as indicated at 54 whereby the inclined faces 54 extend upwardly and inwardly toward the workpiece W'. Engagement of these overlapping and inclined faces as shown in Fig. 7 operates to limit the upward movement of the jaw member 351 under the urging of its respective spring 381. However, the jaw member 351 can move downwardly against this spring 381 to assume a position with respect to the body member 321 as shown in Fig. 11. Otherwise than as described above, the form of the invention shown in Figs. 7 and 8 is constructed and operates in the same manner as described for the form of the invention shown in Figs. 1-6.

The further modified form of the invention shown in Figs. 9, 10 and 11 has a clamping device similar to 261 and hence the same reference numerals are applied. The only difference is in the mode of attaching the clamping device to the base. Referring to Figs. 9 and 10, the base is shown at 202 having an upper flat surface 212. The support for the clamping device is indicated at 282. This support has downwardly extending side walls 55 along opposite lateral sides thereof and inturned horizontal flanges along their lower edges as indicated at 56. These flanges 56 are slidingly received in external horizontal grooves provided in the side walls 242 of the base 202. Each marginal portion of the support 282 and its corresponding inturned flange 56 is provided with a series of longitudinally spaced vertical holes 58. The portion of each side wall 242 between the support 282 and the corresponding flange 56 is provided with a series of longitudinally spaced vertical holes 59. The spacing between the holes 58 is slightly less than the spacing between the holes 59. In this manner, any one of the holes 58 is adapted to be aligned with the holes 59 and to receive a vertical locking pin 60. The locking pin 60 is shown as having an enlarged externally knurled head at its upper end which head facilitates grasping the locking pin for insertion and removal from the holes. Otherwise, the form of the invention shown in Figs. 9 and 10 is similar in construction and operates in the same manner as described for the form of the invention shown in Figs. 7 and 8.

From the foregoing, it will be seen that the present invention provides a parallel and workpiece holder which includes clamping devices which securely hold the workpiece on the upper flat surface on the base of the holder. Once a given longitudinal setting of the clamping devices has been made on the base, the workpiece can be changed rapidly and easily by loosening a pair of jack screws which form a part of the clamping devices. Further, the holder of the invention assures each workpiece being held in a proper position during machining operations thereon without requiring a time consuming original setup operation each time the workpiece is changed. Obviously, the invention has great value where the same machining operation is performed on a succession of identical workpieces. By reducing setup time for each workpiece, as achieved by the present invention, a high rate of production can result.

I claim:

1. A holder for a workpiece, comprising a base on which said workpiece is adapted to be placed, and a pair of clamping devices mounted on said base and adapted to be arranged one on each of opposite sides of said workpiece, each of said clamping devices comprising a support arranged for immovable connection to said base, a body member pivotally mounted on said support about a transverse axis arranged adjacent its front end, a jaw member having a curved work face at its front end adapted to engage said workpiece and pivotally mounted on said body member about a transverse axis arranged in rear of said first mentioned axis, said work face having a radius of curvature generated about an axis arranged below said second mentioned axis, and means for raising the rear end of said body member relative to said support.

2. A holder for a workpiece, comprising a base on which said workpiece is adapted to be placed, and a pair of clamping devices mounted on said base and adapted to be arranged one on each of opposite sides of said workpiece, each of said clamping devices comprising a support arranged for immovable connection to said base, a body member pivotally mounted on said support about a transverse axis arranged adjacent its front end, a jaw member having a curved work face at its front end adapted to engage said workpiece and pivotally mounted on said body member about a transverse axis arranged above and in rear of said first mentioned axis, said work face having a radius of curvature generated about an axis arranged below said second mentioned axis, spring means operatively arranged to urge the front ends of said jaw and body members apart, stop means limiting the separation of said front ends, and means for raising the rear end of said body member relative to said support.

3. A holder as set forth in claim 2 in which said last means comprises a jack screw arranged in a threaded hole in the rear portion of said body member and bearing against said support.

4. A holder as set forth in claim 2 in which said stop means comprise a transverse pin carried by one of said jaw and body members and extending into an enlarged hole in the other of said members.

5. A holder as set forth in claim 2 in which said stop means comprise overlapping surfaces on said jaw and body members.

6. In a holder for a workpiece, a clamping device comprising a support fixed relative to said workpiece, a body member pivotally mounted at one end to said support, a jaw member pivotally mounted on said body member on an axis parallel to and remote from said first mentioned axis, said jaw member having a curved work face generated about an axis parallel to and arranged below said second mentioned axis, and means for turning said body member about said first mentioned axis relative to said support.

7. In a holder for a workpiece, the combination comprising an elongated base having generally a channel shape in cross section, and a clamping device arranged longitudinally adjustably on said base and including a support having a series of longitudinally and uniformly spaced holes, said base having a series of longitudinally and uniformly spaced holes, one of said series of holes being spaced farther apart than in the other, and a locking pin adapted to be inserted in holes of both said series when alined.

8. In a holder for a workpiece, the combination comprising an elongated base having generally a channel shape in cross section and also having opposing longitudinal grooves on the inside of the side walls thereof, and a clamping device arranged longitudinally adjustably on said base and including a slide arranged in said grooves and having a series of longitudinally and uniformly spaced holes extending transversely therethrough, said side walls of said base having a series of longitudinally and uniformly spaced transverse holes therein, one of said series of holes being spaced farther apart than in the other, and a locking pin adapted to be inserted in holes of both said series when alined.

9. In a holder for a workpiece, the combination comprising an elongated base having generally a channel shape in cross section and also having longitudinal grooves on the outside of the side walls thereof, and a clamping device arranged longitudinally adjustably on said base and including a support having generally an inverted channel shape in cross section and inturned flanges at its lower end adapted to be received in said grooves, said support also having a series of longitudinally and uniformly spaced vertical holes therein extending through said flanges thereof, said side walls of said base having a series of longitudinally and uniformly spaced vertical holes therein, one of said series of holes being spaced farther apart than in the other, and a locking pin adapted to be inserted in holes of both said series when alined.

10. In a holder for a workpiece, the combination comprising an elongated base having generally a channel shape in cross section and also having on the outside of each side wall thereof two series of crossed grooves each inclined to the vertical, and a clamping device arranged longitudinally adjustably on said base and including a support having generally an inverted channel shape in cross section and depending side walls embracing said first mentioned side walls and a series of ribs arranged on the inside of said depending side walls and adapted to engage with one or the other of said series of grooves.

References Cited in the file of this patent
UNITED STATES PATENTS

| 1,457,307 | Kerns | June 5, 1923 |
| 1,546,062 | Edmunds | July 14, 1925 |

FOREIGN PATENTS

| 904,373 | Germany | May 24, 1954 |

OTHER REFERENCES

American Machinist, April 10, 1947, page 139.